Nov. 2, 1971   L. S. REID   3,616,623
MIST ELIMINATOR
Filed Jan. 19, 1970
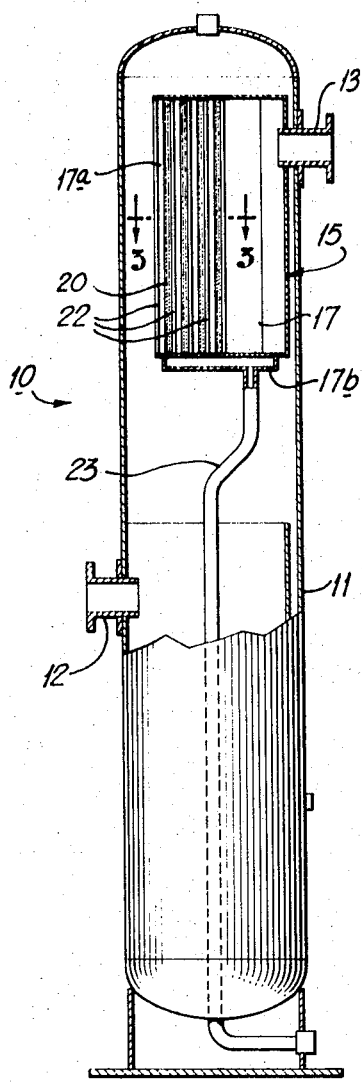
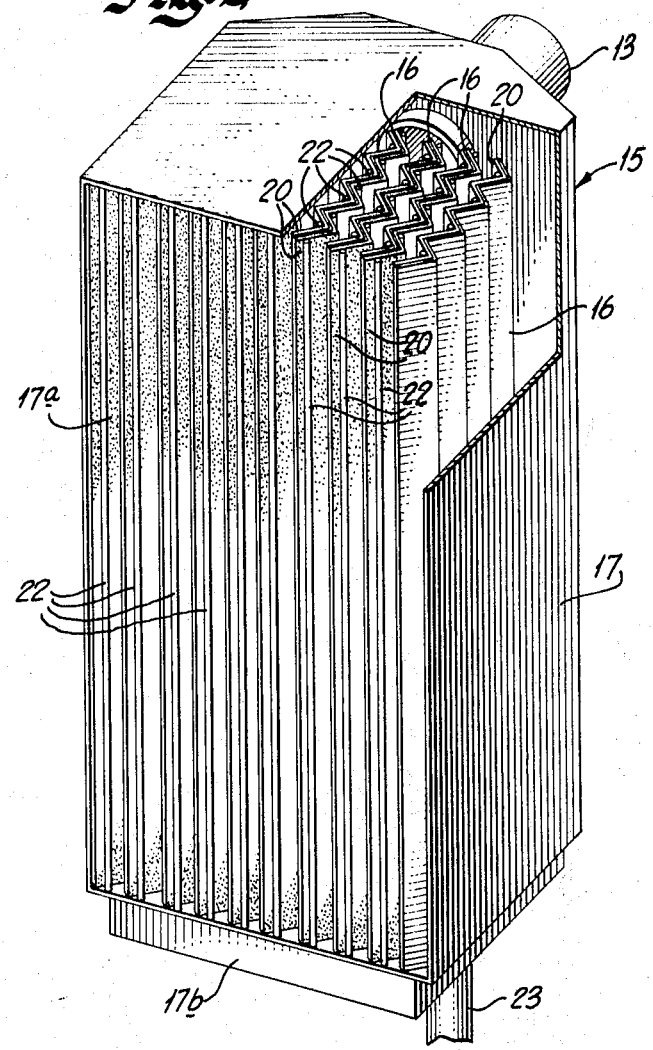
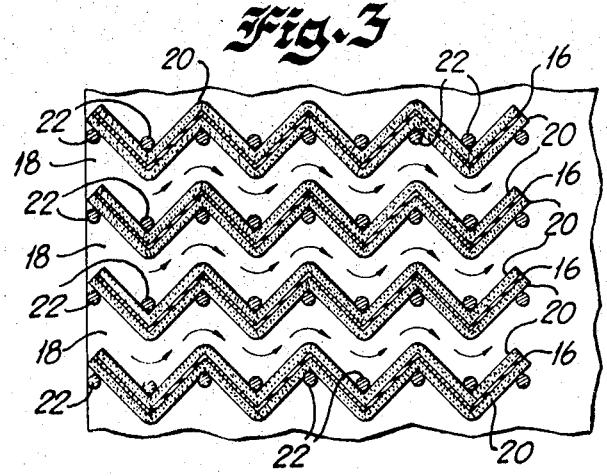
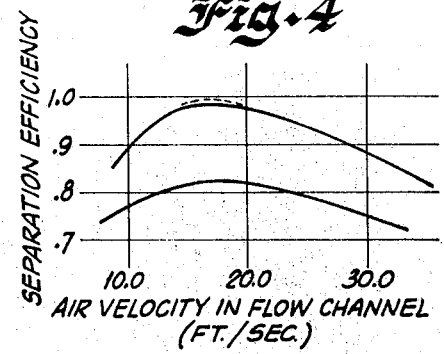
INVENTOR
LAURANCE S. REID
by Mason, Kolehmainen,
Rathburn and Wyss
ATTORNEYS.

United States Patent Office 3,616,623
Patented Nov. 2, 1971

3,616,623
MIST ELIMINATOR
Laurance S. Reid, 610 Broad Lane,
Norman, Okla. 73069
Continuation-in-part of application Ser. No. 596,389, Nov. 15, 1966, which is a continuation-in-part of application Ser. No. 377,273, June 23, 1964. This application Jan. 19, 1970, Ser. No. 3,988
Int. Cl. B01d 45/08
U.S. Cl. 55—440
1 Claim

ABSTRACT OF THE DISCLOSURE

There is provided an improved mist eliminator for use in an apparatus for removing an entrained liquid mist from a liquid particle containing carrier gas of the type including a pressure shell having a gas inlet and a gas outlet. The mist eliminator includes a plurality of generally parallel vanes defining flow paths for the gas, and baffles of permeable porous or fibrous material cover the surfaces of the vanes along the paths.

---

This application is a continuation-in-part of copending application Ser. No. 596,389, filed Nov. 15, 1966, and now abandoned which in turn is a continuation-in-part of the application Ser. No. 377,273, filed June 23, 1964, and also now abandoned.

The present invention relates to an improved mist eliminator, and, more particularly, to an improved mist eliminator of the type for use in removing entrained liquid mist from a liquid particle containing carrier gas.

Many devces for the removal of aerosols or mists from flowing streams of gas have been conceived, fabricated, and used for the purpose of combatting mechanical entrainment with varying degrees of success. Most all have employed the principles of passing the gas through a labyrinth causing it to reverse direction and develop some centrifugal force which is helpful in throwing liquid particles against surfaces where they coalesce and run in a downward direction. Commercially, these devices have evolved into two basic types, a packaged labyrinth of vertical corrugated vanes that cause gas to flow horizontally through the ports between the vanes and twist and turn to throw out liquid particulates which coalesce and run down the vanes to collect in a lower pan whence they drain back to the liquid source or storage reservoir, and secondly a fibrous or porous pad, generally four inches thick or more, so sized that the aerosol particles impinge the fibers, coalesce and drop downward as large drops from the pad despite any lifting action of the flowing gas stream which may move upwards. The coalesced liquids drain down through the pad if it is sufficiently thick to protect the droplets as they descend where otherwise they would reach the downstream edge of the pad and be blown off. These two basic types of mist eliminators have distinct advantages and disadvantages. The vane type device has large gas capacity, but its ability to remove finely divided mists is confined to about 20 microns whereas the fibrous pad has ability to remove aerosols as small as four microns and larger but has relatively small capacity so that large pad areas are required.

Accordingly, it is an object of the present invention to provide a new and improved mist eliminator which overcomes the above disadvantages.

A further object of the present invention is the provision of a new and improved mist eliminator.

Yet another object of the present invention is the provision of a mist eliminator which is capable of cleaning large gas flows using a relatively small device and having a high removal efficiency.

Further objects and advantages of the present invention will become apparent as the following description proceeds. Other features of novelty which characterize the invention will be pointed out with particularity in the claims annexed to and forming a part of the specification.

In accordance with these and other objects of the present invention, there is provided a new and improved mist eliminator, particularly used for removing entrained liquid mist from a liquid particle containing carrier gas, and including a plurality of generally parallel vane defining flow paths for the gas. Baffles of permeable porous or fibrous material cover the surfaces of the vanes along paths. Advantageously, large gas flows may be used in a relatively small device only slightly larger than a typical vane type mist eliminator, but obtaining essentially the same removal efficiency as a fibrous pad. Thus, a small pressure vessel may be used to house the mist eliminator, and supplementary gas cleaning devices downstream may be eliminated.

For a better understanding of the present invention, reference may be had to the accompanying drawings wherein:

FIG. 1 is an elevational sectional view of a gas cleaning apparatus according to the present invention, and illustrating an improved mist eliminator section;

FIG. 2 is a perspective view of the improved mist eliminator section;

FIG 3 is a cross sectional view of the vanes and paths of the most eliminator section, taken along line 3—3 of FIG. 1; and FIG. 4 is a series of curves illustrating the improved efficiency of the present mist eliminator.

Referring now to the drawings, and particularly to FIGS. 1 through 3 thereof, there is illustrated an improved gas scrubber 10 for removing entrained liquid mist from a liquid particle containing carrier gas. The gas scrubber 10 includes a pressure shell 11 having a gas inlet 12 and a gas outlet 13. An improved mist eliminator section 15 is contained with the shell 11.

The mist eliminator section 15 resembles a vane type device with a plurality of vertically disposed vanes 16, FIG. 3, in a mist eliminator housing 17, closed on both sides, top, and bottom, with the downstream side of the housing closed except for connection with the gas outlet 13. The inlet face of the mist eliminator 15, identified generally as 17a, is open and directs the gas flow between the gas inlet 12 and gas outlet 13.

The cleansing of the gas is accomplished as the gas passes through paths 18 formed between the adjacent vanes 16. The vanes are bent at angles and at regular intervals so that the gas is forced to turn or travel through a labyrinth formed in a tortuous path. The surfaces of all vanes along the gas paths 18 are covered with a relatively thin layer of fibrous or permeable porous material defining coalescer baffles of blotter surfaces 20. Such material may be fine wire woven into a uniform mat from such materials as stainless steel, Monel, carbon steel, aluminum or other corrosion resistive materials, or the material may be polyurethane foam or any other suitable natural or synthetic material. This fibrous mat may have any suitable thickness, and thicknesses in the range of ⅛ to ½ inch have been found suitable. The fibrous mat may be secured to the vane 16 in any of a variety of suitable means such as the illustrated restraining bars 22 at the inner angles of the vane bends. However, other suitable mechanical fastening, spot welding, or adhesive means may be used.

Gas with entrained aerosol particulates enters the device through the gas inlet 12, where it is split to flow through the parallel flow paths 18. By change in direction and also due to the extreme degree of turbulent flow that exists, the gas and its entrained liquids are caused to impinge continuously upon the fibrous lining of the vanes. Liquid droplets impinge the fibrous strands, run down and collect with other droplets in masses large enough to drain down to the bottom of the vanes where the liquid is caught in the bottom surface or tray 17b of the housing 17, and overflows into a drainpipe 23 which returns the liquid to the base of the vessel where it is discharged from the system.

In one particular embodiment of the invention with the mist eliminator of the present invention applied to a vertical scrubber, it was found that a 30-inch outside diameter by 12 feet seam-to-seam vessel would handle 37.5 million standard cubic feet of 0.65 specific gravity gas per day at 125 p.s.i.g. and 70° F. A woven wire pad to accomplish the same purpose would require a vertical vessel of 54 inches outside diameter by 10 feet long seam-to-seam, which would be considerably more costly in order to obtain the same separation efficiency.

FIG. 4 illustrates the separation efficiency of a padded vane as against a nonpadded vane with reference to the velocity in the flow paths. It is seen that the efficiency of the padded vane is considerably greater than that of the non-padded vane throughout the range of plotted velocities.

Although the present invention has been described by reference to only a single embodiment thereof, it will be apparent that numerous other modifications and embodiments will be devised by those skilled in the art which fall within the true spirit and scope of the present invention.

What is claimed and desired to be secured by Letters Patent of the United States is:

1. An improved mist eliminator for use in an apparatus for removing entrained liquid mist from a liquid particle containing carrier gas of the type including a pressure shell having gas inlet means and gas outlet means and liquid outlet means, said mist eliminator comprising:
   a plurality of generally parallel vanes defining flow paths for said gas;
   said vanes being bent at angles to form zig-zag configurations for the flow paths at regular intervals defining a labyrinth for said paths;
   at least the surfaces of said vanes being formed of blotter pads along said paths; and
   means for directing flow of gas between the inlet means and the outlet means through said paths wherein liquid particles contained within said carrier gas impinge upon said blotter pads along said paths and means for removing liquid from said paths and passing the liquid to said liquid outlet means.

References Cited
UNITED STATES PATENTS

| | | | |
|---|---|---|---|
| Re. 25,061 | 10/1961 | Raub et al. | 55—444 |
| 1,898,591 | 2/1933 | Mohler et al. | 55—440 |
| 2,997,131 | 8/1961 | Fisher | 55—466 |
| 3,063,220 | 11/1962 | Almquist | 55—462 |
| 3,304,696 | 2/1967 | McKenna | 55—440 |
| 3,444,670 | 5/1969 | Hungate | 55—440 |

FRANK W. LUTTER, Primary Examiner

B. NOZICK, Assistant Examiner

U.S. Cl. X.R.

55—466